United States Patent
Tokuda et al.

(10) Patent No.: US 6,835,498 B2
(45) Date of Patent: Dec. 28, 2004

(54) NICKEL HYDROXIDE ELECTRODE FOR ALKALINE STORAGE BATTERY AND ALKALINE STORAGE BATTERY

(75) Inventors: Mitsunori Tokuda, Tokushima (JP); Takeshi Ogasawara, Kobe (JP); Mutsumi Yano, Hirakata (JP); Shin Fujitani, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 251 days.

(21) Appl. No.: 10/245,682

(22) Filed: Sep. 18, 2002

(65) Prior Publication Data

US 2003/0104277 A1 Jun. 5, 2003

(30) Foreign Application Priority Data

Sep. 18, 2001 (JP) .......................................... 2001-282701

(51) Int. Cl.[7] .................................................. H01M 4/32
(52) U.S. Cl. ........................ 429/223; 429/235; 429/232; 427/58
(58) Field of Search ................................. 429/223, 235, 429/232; 427/58

(56) References Cited

U.S. PATENT DOCUMENTS 6,517,971 B1 * 2/2003 Dansui et al. .............. 429/223

2001/0000484 A1  4/2001  Lv .............................. 429/232

FOREIGN PATENT DOCUMENTS

JP    10-149821 A    6/1998
JP    11-176436 A    7/1999

OTHER PUBLICATIONS

Ohta, K., et al.; "Nicel Hydroxide Electrode: Improvement of Charge Efficiency at High Temperature"; *Proceedings of the Symposium on Hydrogen and Metal Hydride Batteries*; Electrochemical Society Proceedings, vol. 94–27, pp. 296–302; 1994.

* cited by examiner

*Primary Examiner*—Laura Weiner
(74) *Attorney, Agent, or Firm*—Kubovcik & Kubovcik

(57) ABSTRACT

A nickel hydroxide electrode for an alkaline storage battery comprises titanium hydroxide formed on the surface of nickel hydroxide as a main active material impregnated into pores of a porous sintered substrate. An alkaline storage battery comprises a negative electrode and the nickel hydroxide electrode as a positive electrode. The alkaline storage battery provides a high discharge capacity even if the battery is charged under a high temperature atmosphere.

20 Claims, 1 Drawing Sheet

NICKEL HYDROXIDE ELECTRODE FOR ALKALINE STORAGE BATTERY AND ALKALINE STORAGE BATTERY

FIELD OF THE INVENTION

The present invention relates to an alkaline storage battery, for example, a nickel-metal hydride storage battery, nickel-cadmium storage battery, nickel-zinc storage battery and the like, a nickel hydroxide electrode for a positive electrode of the alkaline storage battery and a method for preparing the nickel hydroxide electrode. Especially the invention is characterized as an improved nickel hydroxide electrode for an alkaline storage battery which comprises an active material mainly composed of nickel hydroxide filling pores of a porous sintered substrate which provides a high discharge capacity even if the battery is charged under a high temperature atmosphere.

BACKGROUND OF THE INVENTION

Conventionally in an alkaline storage battery, of which a nickel-metal hydride storage battery and a nickel-cadmium storage battery are typical examples, a nickel hydroxide electrode for an alkaline storage battery containing nickel hydroxide as an active material is employed as a positive electrode.

As such nickel hydroxide electrode for an alkaline storage battery, a sintered nickel electrode has commonly been used. The sintered nickel electrode is prepared by sintering nickel powder on a punched steel plank as a core to obtain a porous sintered substrate, chemically impregnating the porous sintered substrate with a nickel salt, for example, nickel nitrate or the like, and then treating the substrate with an alkaline solution to convert the nickel salt in the pores of the substrate to nickel hydroxide as an active material filling the pores of porous sintered substrate.

The sintered nickel electrode has an advantage of having excellent charge-discharge characteristics because the sintered substrate has good conductivity and nickel hydroxide powder as an active material and the sintered substrate have good adhesion.

However, an alkaline storage battery having the above described sintered nickel electrode is charged under a high temperature atmosphere and there is a problem that sufficient discharge capacity cannot be obtained because an oxygen overvoltage at the positive electrode becomes low and, in addition to the charge reaction in which nickel hydroxide is oxidized to nickel oxyhydroxide, an oxygen generating reaction occurs.

OBJECT OF THE INVENTION

An object of the present invention is to solve the above-described problem of an alkaline storage battery comprising a nickel hydroxide electrode that contains nickel hydroxide as a main active material provided in the pores of a porous sintered substrate.

More specifically, the present invention provides an improved nickel hydroxide electrode for an alkaline storage battery that contains nickel hydroxide as a main active material in the pores of a porous sintered substrate and makes it possible to have a high discharge capacity when the alkaline storage battery is charged at a high temperature.

SUMMARY OF THE INVENTION

The present invention provides a nickel hydroxide electrode for an alkaline storage battery having a titanium hydroxide on the surface of nickel hydroxide as a main active material filling the pores of a sintered substrate. As a titanium hydroxide, titanium hydroxide ($Ti(OH)_4$), titanic acid ($H_4TiO_4$) or the like can be exemplified.

The present invention also provides an alkaline storage battery comprising, as a positive electrode, the nickel hydroxide electrode that comprises titanium hydroxide on the surface of a nickel hydroxide provided in the pores of a sintered substrate.

EXPLANTATION OF ELEMENTS

Figure 1:
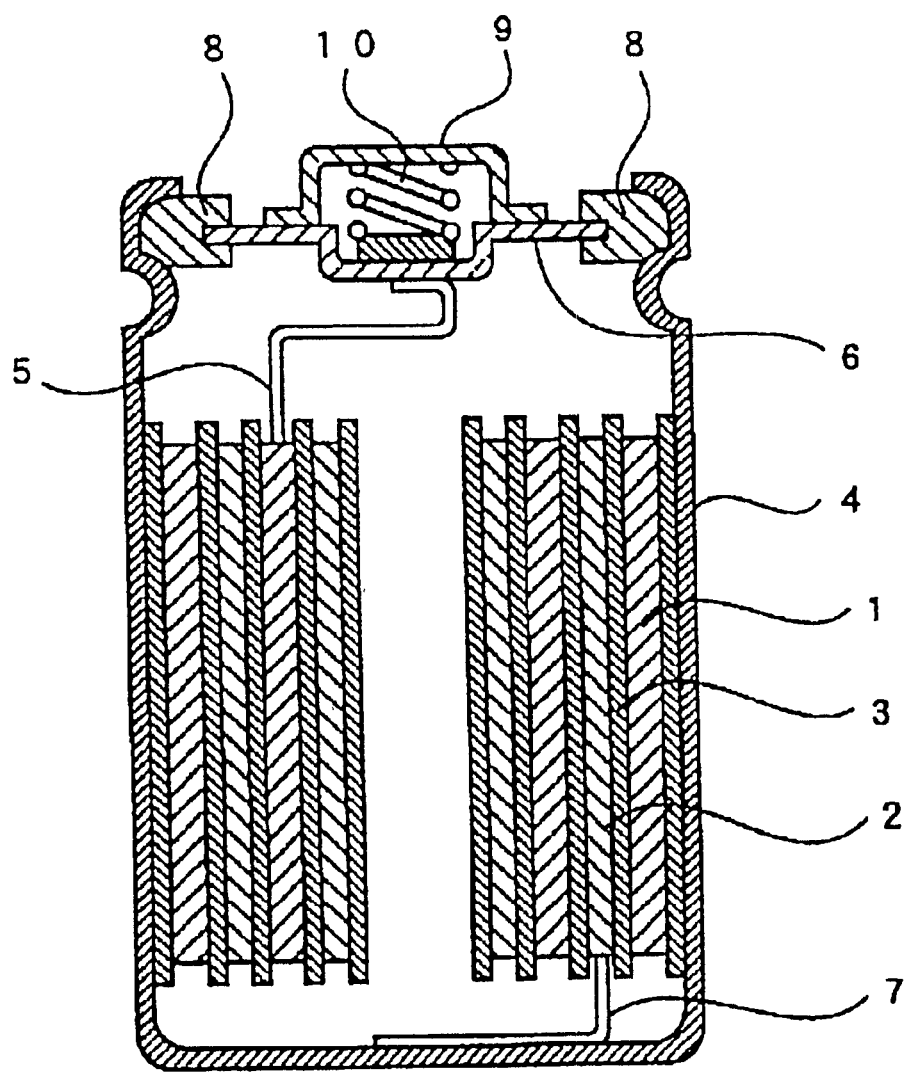
FIG. 1 is a cross section of an alkaline storage battery prepared in the examples and comparative example.

1: positive electrode (nickel hydroxide electrode for an alkaline storage battery)
2: negative electrode
3: separator
4: battery can

DETAILED EXPLANATION OF THE INVENTION

When a titanium hydroxide is present on the surface of nickel hydroxide of a nickel hydroxide electrode for an alkaline storage battery as described above, the titanium hydroxide increases oxygen overvoltage on the positive electrode. An alkaline storage battery having the nickel hydroxide electrode as a positive electrode can inhibit an oxygen generating reaction as a side reaction at the positive electrode and have a high discharge capacity when the alkaline storage battery is charged under a high temperature atmosphere.

If an amount of titanium hydroxide on the surface of the nickel hydroxide relative to the amount of nickel hydroxide is not sufficient, oxygen overvoltage on the positive electrode cannot be sufficiently elevated and an oxygen generating reaction occurs when the battery is charged at a high temperature and high discharge capacity cannot be obtained. On the other hand, if an amount of titanium hydroxide relative to the nickel hydroxide is too great, there is excessive titanium hydroxide between the sintered substrate and nickel hydroxide, and collecting characteristics of the positive electrode are reduced, the active material is under utilized, and discharge capacity is reduced. Therefore, it is preferable that a weight ratio of titanium of the titanium hydroxides to nickel hydroxide is in a range of 0.05 to 3 weight %.

A nickel hydroxide electrode for an alkaline storage battery in which a titanium hydroxide is provided on the surface of nickel hydroxide filled in the pores of a porous sintered substrate, can be prepared in a way such that, for example, after nickel hydroxide is conventionally impregnated into pores of the porous sintered substrate, the porous sintered substrate is dipped in at least a titanate solution selected from titanium trichloride, titanium tetrachloride and titanium sulfate to impregnate titanate into the sintered substrate. Then the porous sintered substrate in which titanate is impregnated is dipped in an alkali solution, for example, sodium hydroxide or the like, to deposit the titanate impregnated into the sintered substrate as a titanium hydroxide on the surface of the nickel hydroxide.

An amount of titanium hydroxide on the surface of the nickel hydroxide can be adjusted by the number of repetitions of the treatment described above to deposit titanium hydroxides on the surface of nickel hydroxide or by changing the period of dipping of the sintered substrate in the titanate solution.

In the nickel hydroxide electrode for an alkaline storage battery of the present invention, it is preferable that at least an element selected from the group consisting of cobalt, zinc, cadmium, manganese and aluminum is included in the nickel hydroxide as a solid solution. The element included as a solid solution helps to increase an oxygen overvoltage at the positive electrode, and an oxygen generating reaction at the positive electrode is further prohibited when the battery is charged at a high temperature so as to obtain a better discharge capacity. When at least an element selected from the group consisting of cobalt and zinc is included as a solid solution, an even better discharge capacity is obtained.

If an amount of an element added to the nickel hydroxide by solution treatment is not sufficient, an oxygen overvoltage at the positive electrode cannot be sufficiently increased, and improved discharge capacity of the battery cannot be obtained after the battery is charged at a high temperature. On the other hand, if an amount of an element added to the nickel hydroxide by solution treatment is excessive, an amount of nickel hydroxide active material is reduced and sufficient discharge capacity cannot be obtained. Therefore, a ratio of the element to be added as a solid solution to the nickel hydroxide is preferably in a range of 0.5 to 10 weight % based on the weight of the nickel hydroxide.

In the nickel hydroxide electrode for an alkaline storage battery of the present invention, it is preferable that, in addition to a titanium hydroxide, a hydroxide of at least one element selected from the group consisting of calcium, cobalt, yttrium and ytterbium is provided on the surface of the nickel hydroxide. The additional hydroxide helps to increase an oxygen overvoltage at the positive electrode, and an oxygen generating reaction at the positive electrode is further inhibited to obtain a higher discharge capacity. Especially, at least a hydroxide of an element selected from the group consisting cobalt and yttrium is provided and a further higher discharge capacity is obtained.

If an amount of hydroxide of an element as described above is not sufficient, an oxygen overvoltage at the positive electrode cannot be sufficiently increased, and improved discharge capacity of the battery cannot be obtained after the battery is charged at a high temperature. On the other hand, if an amount of hydroxide of the element is exceeded, an electron conductivity is reduced and sufficient discharge capacity cannot be obtained. Therefore, a ratio of the element in the hydroxide to the nickel hydroxide is preferably in a range of 0.5 to 5 weight % based on the nickel hydroxide.

Various methods can be employed to provide the hydroxide of the element described above other than a titanium hydroxide on the surface of the nickel hydroxide. The titanium hydroxide and hydroxide of the element described above can be separately provided, or the hydroxide of the element described above can be provided in the form of a mixture with a titanium hydroxide on the surface of the nickel hydroxide.

DESCRIPTION OF PREFERRED EMBODIMENTS

A nickel hydroxide electrode for an alkaline storage battery of the present invention and an alkaline storage battery having the nickel hydroxide electrode as a positive electrode are described below in detail by reference to examples. A comparative example is also described below to make it clear that the alkaline storage battery in the examples has high discharge capacity even when the battery is charged at a high temperature. It is of course understood that the present invention is not limited to the following examples. The present invention can be modified within the scope and spirit of the appended claims.

EXAMPLE A1

In an alkaline storage battery in Example A1, a nickel hydroxide electrode was prepared by the following steps 1 to 3.

Step 1 (Preparation of Sintered Substrate)

Carbonyl nickel powder, carboxy methyl cellulose as a binding agent and water were mixed to make a slurry. The slurry was applied on a punched metal of a thickness of 50 $\mu$m. After being dried, it was sintered at 900° C. for 20 minutes under a hydrogen atmosphere to prepare a sintered substrate having a porosity of 85%, an average diameter of pores of 10 $\mu$m and a thickness of 0.65 mm.

Step 2 (Filling the Pores of the Sintered Substrate with Nickel Hydroxide)

The sintered substrate prepared in Step 1 was dipped in a nickel nitrate ($Ni(NO_3)_2$) solution having a specific gravity of 1.5, and then was dipped in a 25 weight % sodium hydroxide solution. This procedure was repeated six times to impregnate the pores of the sintered substrate with nickel hydroxide.

Step 3 (Addition of titanium Hydroxide on the Surface of Nickel Hydroxide)

The sintered substrate having pores impregnated with nickel hydroxide was dipped in a 0.1 mol/l titanium tetrachloride solution for 30 minutes. After this treatment was repeated four times, the sintered substrate was dried at 60° C. for 30 minutes. Then the sintered substrate was dipped in a 30 weight % sodium hydroxide solution for 30 minutes, and dried at 60° C. for 30 minutes to prepare a nickel hydroxide electrode for an alkaline storage battery having a titanium hydroxide adhered to the surface of nickel hydroxide.

The ratio by weight of titanium (Ti) of the titanium hydroxide to the nickel hydroxide in the prepared nickel hydroxide electrode for an alkaline storage battery was measured by ICP (Inductively Coupled Plasma Emission Spectrometry), and was 1 weight %.

The nickel hydroxide electrode for an alkaline storage battery was used as a positive electrode, and a paste cadmium electrode that has been conventionally used was used as a negative electrode. Polyamide unwoven fabric was used as a separator. A 30 weight % potassium hydroxide solution was used as an alkaline electrolyte. An alkaline storage battery of Example A1 was prepared as shown in FIG. 1 having AA size and a capacity of 1000 mAh.

In the alkaline storage battery, a separator 3 was inserted between a positive electrode 1 and a negative electrode 2 as shown in FIG. 1. Then the electrodes and separator were rolled like a spiral and were placed in a battery can 4. The alkaline electrolyte was poured in the battery can 4. After the can was sealed, the positive electrode 1 was connected to a positive electrode sealing lid 6 through a positive electrode lead 5, and the negative electrode 2 was connected to the battery can 4 through a negative electrode lead 7. The battery can 4 and the positive electrode lid 6 were electrically separated by an insulating packing 8.

A coil spring 10 was placed between the positive sealing lid 6 and an external positive electrode terminal 9. The coil spring 10 is compressed and releases gas from inside of the battery to the atmosphere when pressure in the battery unusually increases.

COMPARATIVE EXAMPLE 1

A nickel hydroxide electrode for an alkaline storage battery was prepared using only steps 1 and 2 as described above in the preparation of the nickel hydroxide electrode for an alkaline storage battery in Example A1 without step 3. That is, in the nickel hydroxide electrode used in Comparative Example 1, nickel hydroxide was impregnated into pores of the sintered substrate but a titanium hydroxide was not adhered on the surface of the nickel hydroxide.

A battery having AA size and a capacity of 1000 mA was prepared in the same manner as Example A1 except that the nickel hydroxide electrode prepared above was used as a positive electrode.

Each alkaline storage battery in Example A1 and Comparative Example 1 was charged at a charge current of 100 mA at a temperature of 25° C. for 16 hours, and then was discharged to 1.0 V at a temperature of 25° C. at a discharge current of 1000 mA. Charge and discharge cycles were repeated five times. Discharge capacity (Q5) at the fifth cycle for each battery was measured.

A relative index of the discharge capacity (Q5) of the battery in Comparative Example 1 when the discharge capacity (Q5) of the battery in Example A1 was 100 was calculated. The results are shown in Table 1 as a capacity index.

After charge and discharge cycles were repeated five times, each battery in Example A1 and Comparative Example 1 was charged at a high temperature of 60° C. at a charge current of 100 mA for 16 hours, and then was discharged to 1.0 V at a temperature of 25° C. at a discharge current of 1000 mA. A discharge capacity (Q6) at the sixth cycle for each battery was measured.

A ratio (R) of the discharge capacity (Q6) to the discharge capacity (Q5), i.e., R(%)=(Q6/Q5)×100, for each battery was calculated. The results are also shown in Table 1. The greater R means that reduction of discharge capacity is small when a battery is charged at a high temperature.

TABLE 1

|  | Capacity Index | R (%) |
|---|---|---|
| Example A1 | 100 | 80 |
| Comparative Example 1 | 98 | 70 |

It is clear from the results that the alkaline storage battery in Example A1 in which the nickel hydroxide electrode for a storage battery having titanium hydroxide on the surface of nickel hydroxide was used as the positive electrode could inhibit reduction of the discharge capacity when the battery was charged at a high temperature as compared with the alkaline storage battery in Comparative Example 1 in which the nickel hydroxide electrode for a storage battery not having titanium hydroxide on the surface of nickel hydroxide was used as the positive electrode.

EXAMPLES A2 TO A7

In Examples A2 to A7, nickel hydroxide electrodes for a storage battery were prepared in the same manner as Example A1 except that the conditions of step 3 for providing a titanium hydroxide on the surface of the nickel hydroxide that was impregnated into the pores of a sintered substrate were modified.

In Examples A2 and A3, the dipping period of the sintered substrate having nickel hydroxide filling its pores into 0.1 mol/l of titanium chloride was changed. The period was reduced to five minutes in Example A2 and to ten minutes in Example A3 as shown in Table 2.

In Examples A4 to A7, the sintered substrates were dipped in 0.1 mol/l of titanium chloride for 30 minutes, dried at 60° C. for 30 minutes, and were dipped in 30 weight % sodium hydroxide solution for 30 minutes, and then were dried at 60° C. for 30 minutes. Each sintered substrate in Examples A4 to A7 was treated a different number of times with titanium chloride and sodium hydroxide solution as shown in Table 2. That is, one time in Example A4, three times in Example A5, eight times in Example A6, and ten times in Example A7.

The ratio by weight of titanium (Ti) of the titanium hydroxide to the nickel hydroxide in the prepared nickel hydroxide electrodes for an alkaline storage battery was measured by ICP (Inductively Coupled Plasma Emission Spectrometry). The results are shown in Table 2.

Batteries having AA size and a capacity of 1000 mA in Examples A2 to A7 were prepared in the same manner as Example A1 except that the nickel hydroxide electrodes prepared above were used.

Discharge capacities at the fifth cycle (Q5) for the batteries in Examples A2 to A7 were measured in the same manner as that of the battery in Example A1.

A relative index of discharge capacity (Q5) of each battery in Examples A2 to A7 when the discharge capacity (Q5) of the battery in Example A1 was 100 was calculated. The results are shown in Table 2 as capacity indexes.

After charge and discharge cycles were repeated five times, each battery in Examples A2 to A7 was charged at a high temperature of 60° C. at a charge current of 100 mA for 16 hours, and then was discharged to 1.0 V at a temperature of 25° C. at a discharge current of 1000 mA in the same way as the battery in Example A1. A discharge capacity (Q6) at the sixth cycle for each battery was measured. a ratio R (%), the discharge capacity (Q5) at fifth cycle to the discharge capacity (Q6) at sixth cycle, was calculated. The results are shown in Table 2.

TABLE 2

| | Step 3 | | | | |
|---|---|---|---|---|---|
| Example | Each Dipping Period (min.) | Number of Treatment (times) | Ti Ratio (wt %) | Capacity Index | R (%) |
| A2 | 5 | 4 | 0.01 | 97 | 71 |
| A3 | 10 | 4 | 0.05 | 100 | 78 |
| A4 | 30 | 1 | 0.2 | 100 | 79 |
| A5 | 30 | 3 | 0.6 | 100 | 79 |
| A1 | 30 | 4 | 1 | 100 | 80 |
| A6 | 30 | 8 | 3 | 98 | 79 |
| A7 | 30 | 10 | 4 | 93 | 78 |

As is clear from the results shown in Table 2, each of the alkaline storage batteries in Examples A2 to A7 in which a nickel hydroxide electrode for a storage battery having titanium hydroxide on the surface of nickel hydroxide was used as the positive electrode could inhibit reduction of the discharge capacity when the battery was charged at the same high temperature as the battery in Example A1 as compared with the alkaline storage battery in Comparative Example 1 in which the nickel hydroxide electrode not having titanium hydroxide on the surface of nickel hydroxide was used as the positive electrode. The alkaline batteries in Examples A1 and A3 to A6 having a titanium (Ti) ratio by weight of 0.05 to 3 weight % have excellent discharge capacity and reduction of discharge capacity after the batteries were charged at the high temperature was significantly less.

EXAMPLES B1 TO B6

In Examples B1 to B6, when the nickel hydroxide electrode for an alkaline storage battery was prepared, at least one element selected from the group consisting of cobalt (Co), zinc (Zn), cadmium (Cd), manganese (Mn) and aluminum (Al) was added to the nickel hydroxide as a solid solution.

In Examples B1 to B6, the nickel hydroxide electrode for a alkaline storage battery was prepared in the same manner as Example A1 except that in step 2 a mixture was used instead of a nickel nitrate solution having a specific gravity of 1.5. That is, a mixture of nickel nitrate and cobalt nitrate $(Co(NO_3)_2 \cdot 6H_2O)$ (having a specific gravity of 1.5) in a ratio of 12.6:1 by weight in Example B1; a mixture of nickel nitrate and zinc nitrate $(Zn(NO_3)_2 \cdot 6H_2O)$ (having a specific gravity of 1.5) in a ratio of 13.7:1 by weight in Example B2; a mixture of nickel nitrate and cadmium nitrate $(Cd(NO_3)_2 \cdot 4H_2O)$ (having a specific gravity of 1.5) in a ratio of 22.7:1 by weight in Example B3; a mixture of nickel nitrate and manganese nitrate $(Mn(NO_3)_2 \cdot 6H_2O)$ (having a specific gravity of 1.5) in a ratio of 11.9:1 by weight in Example B4; a mixture of nickel nitrate and aluminum nitrate $(Al(NO_3)_2 \cdot 9H_2O)$ (having a specific gravity of 1.5) in a ratio of 4.5:1 by weight in Example B5; and a mixture of nickel nitrate, cobalt nitrate $(Co(NO_3)_2 \cdot 6H_2O)$ and zinc nitrate $(Zn(NO_3)_2 \cdot 6H_2O)$ (having a specific gravity of 1.5) in a ratio of 31.5:1:2.3 by weight in Example B6 were used.

The ratio by weight of each element added as a solid solution to nickel hydroxide in each nickel hydroxide electrode for an alkaline storage battery prepared above was measured by ICP (Inductively Coupled Plasma Emission Spectrometry). The results are shown in Table 3. Titanium ratio by weight of the titanium hydroxide to nickel hydroxide was 0.2 weight % as in Example A1.

Each alkaline storage battery having AA size and capacity of 1000 mAh in Examples B1 to B6 was prepared in the same manner as Example A1 except that the nickel hydroxide electrodes prepared above were used.

Discharge capacity at the fifth cycle (Q5) of each alkaline storage battery in Examples B1 to B6 was measured in the same manner as Example A1. A relative index of discharge capacity (Q5) of each battery in Example B1 to B6 when the discharge capacity (Q5) of the battery in Example A1 was 100 was calculated. The results are shown in Table 3 as a capacity index.

After charge and discharge cycles were repeated five times, each battery in Examples B1 to B6 was charged at a high temperature of 60° C. at a charge current of 100 mA for 16 hours, and then was discharged to 1.0 V at a temperature of 25° C. at a discharge current of 1000 mA in the same way as the battery in Example A1. A discharge capacity (Q6) at the sixth cycle for each battery was measured. A ratio R (%), the discharge capacity (Q5) at the fifth cycle to the discharge capacity (Q6) at the sixth cycle, was calculated. The results are shown in Table 3.

TABLE 3

| | Solid Solution Element | | Capacity | R |
|---|---|---|---|---|
| Battery | Element | Ratio (wt %) | Index | (%) |
| B1 | Co | 5 | 100 | 83 |
| B2 | Zn | 5 | 100 | 83 |
| B3 | Cd | 5 | 100 | 81 |
| B4 | Mn | 5 | 100 | 81 |
| B5 | Al | 5 | 100 | 81 |
| B6 | Co | 2 | 100 | 85 |
| | Zn | 5 | | |
| A1 | — | — | 100 | 80 |

As is clear from the results, the alkaline storage batteries in each of Examples B1 to B6 in which a nickel hydroxide electrode having an element selected from the group consisting of cobalt (Co), zinc (Zn), cadmium (Cd), manganese (Mn) and aluminum (Al) included in the nickel hydroxide as a solid solution and titanium hydroxide provided on the surface of the nickel hydroxide was used as the positive electrode inhibited reduction of the discharge capacity when the battery was charged at the high temperature more than did the battery in Example A1. The alkaline storage batteries in Examples B1, B2 and B6 having an element selected from the group consisting of cobalt (Co) and zinc (Zn) included in nickel hydroxide as a solid solution especially inhibited reduction of discharge capacity after the batteries were charged at the high temperature.

EXAMPLE C1 TO C5

In Examples C1 to C5, a hydroxide of at least one element selected from the group consisting of calcium (Ca), cobalt (Co), yttrium (Y) and ytterbium (Yb) was further provided on the surface of nickel hydroxide after a titanium hydroxide was adhered on the surface of the nickel hydroxide impregnated into pores of a sintered substrate by steps 1 to 3 to prepare a nickel hydroxide electrode in the same manner as Example A1.

The hydroxide of an element described above was added using 0.12 mol/l calcium nitrate solution in Example C1, 0.08 mol/l cobalt nitrate solution in Example C2, 0.05 mol/l yttrium nitrate solution in Example C3, 0.03 mol/l ytterbium nitrate solution in Example C4, and a mixture of 0.08 mol/l cobalt nitrate solution and 0.05 mol/l yttrium nitrate solution in Example C5.

After titanium hydroxide was formed on the surface of nickel hydroxide in the sintered substrate, the sintered substrate was dipped in the above solution for 30 minutes, and was dried at 60° C. for 30 minutes. Then the sintered substrate was dipped in 30 weight % sodium hydroxide solution for 30 minutes, and was dried at 60° C. for 30 minutes. These steps were repeated four times to prepare a nickel hydroxide electrode for an alkaline storage battery having a hydroxide of the element(s) as shown in Table 4 in addition to titanium hydroxide.

The ratio by weight of each element to nickel hydroxide in each nickel hydroxide electrode for an alkaline storage battery prepared above was measured by ICP (Inductively Coupled Plasma Emission Spectrometry). The results are shown in Table 4. The titanium ratio by weight of the titanium hydroxide to the nickel hydroxide was 0.2 weight % as in Example A1.

Each alkaline storage battery having AA size and a capacity of 1000 mAh in Examples C1 to C5 was prepared in the same manner as Example A1 except that the nickel hydroxide electrode was prepared as above.

Discharge capacity at the fifth cycle (Q5) of each alkaline storage battery in Examples C1 to C5 was measured in the same manner as Example A1. A relative index of discharge capacity (Q5) of each battery in Examples C1 to C6 when the discharge capacity (Q5) of the battery in Example A1 was 100 was calculated. The results are shown in Table 4 as a capacity index.

After charge and discharge cycles were repeated five times, each battery in Examples C1 to C5 was charged at a high temperature of 60° C. at a charge current of 100 mA for 16 hours, and then was discharged to 1.0 V at a temperature of 25° C. at a discharge current of 1000 mA in the same way as in Example A1. A discharge capacity (Q6) at the sixth cycle for each battery was measured. A ratio R (%), the discharge capacity (Q5) at the fifth cycle to the discharge capacity (Q6) at the sixth cycle, was calculated. The results are shown in Table 4.

TABLE 4

| Example | Hydroxide of Additional Element | | Capacity Index | R (%) |
|---|---|---|---|---|
| | Element | Ratio (wt %) | | |
| C1 | Ca | 1 | 100 | 82 |
| C2 | Co | 1 | 100 | 84 |
| C3 | Y | 1 | 100 | 85 |
| C4 | Yb | 1 | 100 | 82 |
| C5 | Co | 0.5 | 100 | 87 |
| | Y | 0.5 | | |
| A1 | — | — | 100 | 80 |

As is clear from the results, the alkaline storage battery in each of Examples C1 to C5 in which a nickel hydroxide electrode having a hydroxide of an element selected from the group consisting calcium (Ca), cobalt (Co), yttrium (Y) and ytterbium (Yb), in addition to titanium hydroxide, provided on the surface of the nickel hydroxide was used as the positive electrode could further inhibit reduction of the discharge capacity than the battery in Example A1 when the battery was charged at a high temperature. The alkaline storage batteries in Examples C2, C3 and C5 having a hydroxide of an element selected from the group consisting of cobalt (Co) and yttrium (Y) on the surface of the nickel hydroxide, in addition to titanium hydroxide, particularly inhibited reduction of discharge capacities after the batteries were charged at the high temperature.

ADVANTAGES OF THE INVENTION

As described above in detail, an alkaline storage battery of the present invention in which a nickel hydroxide electrode having a titanium hydroxide formed on the surface of nickel hydroxide impregnated into pores of a sintered substrate is used as a positive electrode, has an elevated oxygen overvoltage on the positive electrode because of the titanium hydroxide formed on the surface of nickel hydroxide so that when the alkaline storage battery of the present invention is charged at a high temperature, an oxygen generating reaction as a side reaction at the positive electrode is inhibited and it is possible to obtain a high discharge capacity.

What is claimed is:

1. A nickel hydroxide electrode for an alkaline storage battery comprising a porous sintered substrate, nickel hydroxide impregnated into pores of the porous sintered substrate and titanium hydroxide formed on a surface of the nickel hydroxide.

2. The nickel hydroxide electrode for an alkaline storage battery according to claim 1, wherein a weight ratio of titanium of said titanium hydroxide to the nickel hydroxide is in a range of 0.05 to 3 weight %.

3. The nickel hydroxide electrode for an alkaline storage battery according to claim 2, wherein at least one element selected from the group consisting of cobalt, zinc, cadmium, manganese and aluminum is included in said nickel hydroxide as a solid solution.

4. The nickel hydroxide electrode for an alkaline storage battery according claim 2, wherein a hydroxide of at least one element selected from the group consisting of calcium, cobalt, yttrium and ytterbium is additionally formed on the surface of said nickel hydroxide.

5. The nickel hydroxide electrode for an alkaline storage battery according to claim 1, wherein at least one element selected from the group consisting of cobalt, zinc, cadmium, manganese and aluminum is included in said nickel hydroxide as a solid solution.

6. The nickel hydroxide electrode for an alkaline storage battery according to claim 5, wherein a weight ratio of said element included in said nickel hydroxide as a solid solution to the nickel hydroxide is in a range of 0.5 to 10 weight %.

7. The nickel hydroxide electrode for an alkaline storage battery according to claim 5, wherein a hydroxide of at least one element selected from the group consisting of calcium, cobalt, yttrium and ytterbium is additionally formed on the surface of said nickel hydroxide.

8. The nickel hydroxide electrode for an alkaline storage battery according to claim 1, wherein a hydroxide of at least one element selected from the group consisting of calcium, cobalt, yttrium and ytterbium is additionally formed on the surface of said nickel hydroxide.

9. The nickel hydroxide electrode for an alkaline storage battery according to claim 8, wherein a weight ratio of the element in said hydroxide of at least one element selected from the group consisting of calcium, cobalt, yttrium and ytterbium to said nickel hydroxide is preferably in a range of 0.5 to 5 weight %.

10. An alkaline storage battery comprising a positive electrode, a negative electrode and an alkaline electrolyte, wherein said positive electrode comprises a porous sintered substrate, nickel hydroxide impregnated into pores of the porous sintered substrate and titanium hydroxide formed on a surface of the nickel hydroxide.

11. The alkaline storage battery according to claim 10, wherein a weight ratio of titanium of said titanium hydroxide to the nickel hydroxide is in a range of 0.05 to 3 weight %.

12. The alkaline storage battery according to claim 11, wherein at least one element selected from the group consisting of cobalt, zinc, cadmium, manganese and aluminum is included in said nickel hydroxide as a solid solution.

13. The alkaline storage battery according to claim 11, wherein a hydroxide of at least one element selected from the group consisting of calcium, cobalt, yttrium and ytterbium is additionally formed on the surface of said nickel hydroxide.

14. The alkaline storage battery according to claim 10, wherein at least one element selected from the group consisting of cobalt, zinc, cadmium, manganese and aluminum is included in said nickel hydroxide as a solid solution.

15. The alkaline storage battery according to claim 14, wherein a weight ratio of said element included in said nickel hydroxide as a solid solution to the nickel hydroxide is in a range of 0.5 to 10 weight %.

16. The alkaline storage battery according to claim 14, wherein a hydroxide of at least one element selected from the group consisting of calcium, cobalt, yttrium and ytterbium is additionally formed on the surface of said nickel hydroxide.

17. The alkaline storage battery according to claim 10, wherein a hydroxide of at least one element selected from the group consisting of calcium, cobalt, yttrium and ytterbium is additionally formed on the surface of said nickel hydroxide.

18. The alkaline storage battery according to claim 17, wherein a weight ratio of the element in said hydroxide of at least one element selected from the group consisting of calcium, cobalt, yttrium and ytterbium to said nickel hydroxide is in a range of 0.5 to 5 weight %.

19. A method for preparing a nickel hydroxide electrode for an alkaline storage battery comprising:

providing an electrode comprising a porous sintered substrate having nickel hydroxide impregnated into pores of the porous sintered substrate;

impregnating said pores of said porous sintered substrate with a titanium salt; and treating said titanium salt with an alkali solution to deposit titanium hydroxide onto a surface of said nickel hydroxide.

20. The method for preparing a nickel hydroxide electrode for an alkaline storage battery according to claim 19, wherein said titanium salt is selected from the group consisting of titanium trichloride, titanium tetrachloride and titanium sulfate.

* * * * *